United States Patent

Jinnai et al.

[11] Patent Number: 5,812,726
[45] Date of Patent: Sep. 22, 1998

[54] OPTICAL FIBRE ARRAY AND METHOD FOR MANUFACTURING SAME

[75] Inventors: Kuniaki Jinnai; Michio Ohba, both of Tokyo, Japan

[73] Assignee: Mitsubishi Gas Chemical Co., Inc., Japan

[21] Appl. No.: 773,501

[22] Filed: Dec. 23, 1996

[30] Foreign Application Priority Data

Dec. 27, 1995 [JP] Japan .................................. 7-340667

[51] Int. Cl.⁶ .................................................. G02B 6/36
[52] U.S. Cl. ........................... 385/137; 385/51; 385/80; 385/83
[58] Field of Search .................... 385/39, 43, 51–53, 385/59, 60, 72, 76–78, 80, 83, 85, 136, 137

[56] References Cited

U.S. PATENT DOCUMENTS

| | | | |
|---|---|---|---|
| 4,598,975 | 7/1986 | Bussard et al. | 385/78 |
| 5,321,785 | 6/1994 | Iida et al. | 385/85 |
| 5,377,286 | 12/1994 | Iida et al. | 385/80 X |
| 5,425,118 | 6/1995 | Sugihara et al. | 385/51 |
| 5,446,815 | 8/1995 | Ota et al. | 385/83 X |
| 5,602,951 | 2/1997 | Shiota et al. | 385/77 X |
| 5,671,315 | 9/1997 | Tabuchi et al. | 385/137 |

FOREIGN PATENT DOCUMENTS 59-189304  10/1994  Japan .
WO95/29422  11/1995  WIPO .

*Primary Examiner*—John D. Lee
*Attorney, Agent, or Firm*—Sterne, Kessler, Goldstein & Fox P.L.L.C.

[57] ABSTRACT

An optical fiber array, wherein a plurality of optical fibers are inserted between a pair of substrates consisting of a first substrate, wherein a parallel groove is formed at one end thereof for accommodating the ends of portions of a plurality of optical fibers where no covering portions are formed, an approximately rectangular groove is formed at the other end thereof for accommodating the portions of said optical fibers where covering portions are formed, and a tapered groove is formed which connects from said parallel groove towards the approximately rectangular groove whilst rectangular groove is formed at said other end thereof for accommodating the portions of said optical fibers where covering portions are formed.

6 Claims, 4 Drawing Sheets

OPTICAL FIBRE ARRAY AND METHOD FOR MANUFACTURING SAME

BACKGROUND OF THE INVENTION

1. Field of the Invention

The present invention relates to an optical fibre array used as a component for an optical communications device, and to a method for manufacturing same.

2. Description of the Prior Art

An optical fibre array is formed by arraying a plurality of optical fibres in a substrate, or on a substrate, to a high degree of positional accuracy, and it is an indispensable optical component for connection with waveguide-type optical components having a plurality of input/output terminals, or array-type optical components wherein a plurality of light-emitting elements and light-receiving elements are arrayed. With the progress of optical communications technology in recent years, higher positional accuracy and lower cost have been demanded in optical fibre arrays.

A conventional optical fibre array and a method for manufacturing same is now described with reference to the drawings.

FIG. 8 and FIG. 10 are conceptual diagrams showing the structure of a conventional optical fibre array, and FIG. 9, FIG. 11 and FIG. 12 are conceptual diagrams showing one part of a manufacturing process for an optical fibre array.

The optical fibre array shown in FIG. 8 is manufactured using a substrate 20 comprising a plurality of guide grooves 10 as depicted in FIG. 9, an optical fibre 1 being arrayed respectively along each of these guide grooves 10, and a planar substrate 21 being superposed thereon such that it applies pressure thereto.

Furthermore, the optical fibre array shown in FIG. 10 is manufactured using two substrates 23 and 24 comprising step portions. A plurality of optical fibres 1 are arrayed on one substrate 23 (see FIG. 11(a)), and the other substrate 24 is superposed thereon. This substrate 24 is then moved in a direction parallel to the arrow in FIG. 11(b), and this movement is halted and the substrate 24 is fixed at a point where the optical fibres 1 are aligned in close mutual contact.

Although it is possible to form an optical fibre array having the desired positional accuracy by means of conventional manufacturing methods of this kind, in the method illustrated in FIG. 8, a high degree of accuracy is required in processing when forming the guide grooves 10 in the substrate 20, since the accuracy in arraying the optical fibres 1 is determined by the precision of the guide grooves 10. In particular, the closer the contact between the optical fibres 1, the greater the need to reduce the array spacing between the optical fibres, therefore requiring extremely high-precision processing technology. Therefore, there is a problem in that the substrate becomes expensive.

On the other hand, if the diameter of the optical fibre coverings is greater than the array pitch, then stress due to bending will occur in the optical fibres 1 at the end portions of the respective guide grooves 10 when the optical fibres 1 are accommodated in the guide grooves 10. Consequently, there has been a problem in that fine cracks are liable to appear in the optical fibres 1, and rupturing, and the like, is liable to occur.

Furthermore, in the manufacturing method illustrated in FIG. 10, the optical fibres 1 are held between two substrates 23 and 24 and, in this state, they are aligned and brought into close mutual contact by moving one substrate 24 in a lateral direction. In this operation, there is a problem in that friction is produced between the optical fibres 1 and the substrates 23 and 24, and fine cracks are liable to occur in the optical fibres 1. Moreover, there is a problem in that the optical fibres 1 are liable to rupture due to the generation of torsional stress in the optical fibres 1.

A conceivable approach for overcoming these problems is to reduce the pressure at which the optical fibres 1 are held between the two substrates 23 and 24. However, if this pressure is too low, there is a problem in that the arrayed optical fibres 1 will shift from their set positions, assuming a non-linear cross-sectional arrangement as shown in FIG. 12, and the desired performance will not be obtained.

In order to achieve a linear state of array of the optical fibres, without producing any faults, such as ruptures, or the like, therein, extremely fine adjustment is required of the pressure at which the optical fibres are held between the substrate, and the pressure by which the substrate is moved in a lateral direction. Accordingly, there is a problem in that the operation of arraying the optical fibres is not simple, and as a result, it is difficult to obtain optical fibre arrays at a high yield rate.

SUMMARY OF THE INVENTION

An object of the present invention is to overcome the conventional problems described above, and it provides an optical fibre array and a method of manufacturing same, whereby the array pitch is matched to the outer diameter of the optical fibres and high positional accuracy can be achieved by means of a simple arraying operation, without provides an optical fibre array comprising a pair of requiring high-precision processing of the substrates. In order to achieve this object, the present invention substrates, consisting of a first substrate and a second substrate, and a plurality of optical fibres, the end portions of which are fixed to the pair of substrates, wherein the ends of portions of the plurality of optical fibres where no covering portions are formed are formed into a closely-contacting array in a line at one end of the substrates; the portions of the optical fibres where covering portions are formed are held at the other end of the substrates; the first substrate comprises, in the side at the one end thereof, a parallel groove for accommodating the ends of the portions of the plurality of optical fibres where no covering portions are formed, in the side at the other end thereof, an approximately rectangular groove for accommodating the portions of the optical fibres where covering portions are formed, and a tapered groove which connects from the parallel groove towards the approximately rectangular groove whilst widening; and the second substrate comprises, in the side at the other end thereof, a rectangular groove for accommodating the portions of the optical fibres where covering portions are formed.

It is appropriate for the parallel groove to have a width larger than the sum of the diameters of the plurality of optical fibres arranged therein, and for the depth of the parallel groove to be smaller than the diameter of the optical fibres.

Furthermore, if the width w of the parallel groove is taken as W and its depth as D, and the cladding diameter of the optical fibres, as L, and the number of arrayed optical fibres, as n, then it is even more desirable if the following formulae (1) and (2) are satisfied.

$$nK < W < nK + 2L \tag{1}$$

$$(1/2)K < D < K \tag{2}$$

Moreover, the present invention provides a method of manufacturing an optical fibre array comprising: a process whereby a first substrate, wherein a parallel groove is formed at one end thereof for accommodating the ends of portions of a plurality of optical fibres where no covering portions are formed, an approximately rectangular groove is formed at the other end thereof for accommodating the portions of the optical fibres where covering portions are formed, and a tapered groove is formed which connects from the parallel groove towards the approximately rectangular groove whilst widening, is coated, or filled, with adhesive, on the side thereof wherein the grooves are formed; a process whereby a second substrate, wherein an approximately rectangular groove is formed at the other end thereof for accommodating the portions of the optical fibres where covering portions are formed, is coated, or filled, with adhesive, on the side thereof wherein the groove is formed; a process whereby the first substrate and second substrate are placed in mutual opposition such that their respective grooves are facing each other; a process whereby the borders between the portions of the plurality of optical fibres where no covering portions are formed and the portions thereof where covering portions are formed, are aligned, and the covering portions are arrayed provisionally in a flat configuration in close mutual contact; a process whereby the ends of the portions of the provisionally arrayed optical fibres where no covering portions are formed, are inserted from the side of the substrates placed in mutual opposition which contains the rectangular grooves, and into the relevant groove; a process whereby, after the insertion, the second substrate is pressed down on the first substrate such that the inserted optical fibres form close contact with the substrates; a process whereby the adhesive is caused to harden whilst maintaining the state of pressing, and the first substrate and second substrate, and the plurality of optical fibres, are fixed together to form an integrated unit; and a process whereby, after the fixing, the exposed ends of the portions of the optical fibres where no covering portions are formed, are polished.

DETAILED DESCRIPTION OF THE PREFERRED EMBODIMENTS

As shown in FIG. 1 to FIG. 5, the optical fibre array relating to the mode for implementing the present invention is constituted by a first substrate 2, a second substrate 3 superposed on the first substrate 2, optical fibres 1 arrayed between the first substrate 2 and the second substrate 3, and an adhesive 8 for fixing these optical fibres 1.

Figure 4:
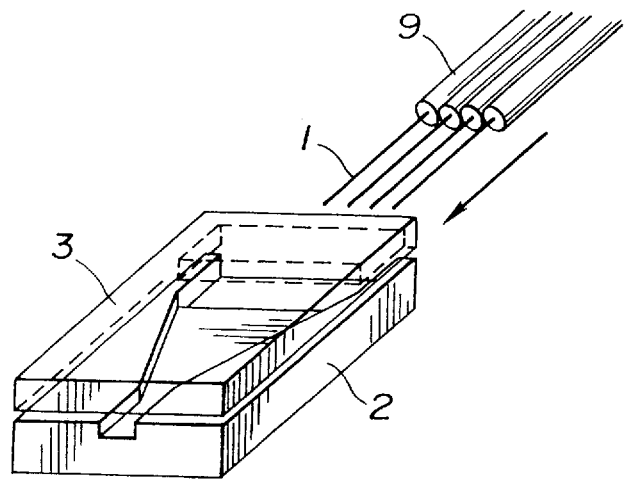
FIG. 4 is an oblique diagram showing a plurality of optical fibres inserted in a space formed by superposing the substrates shown in FIG. 2 and FIG. 3.

Although not specially indicated in the drawings, the optical fibres 1 consist of a core covered on the outer circumference thereof by a cladding, and as shown in FIG. 4 in particular, in the present mode for implementation, covering portions 9 covering the optical fibres 1 are formed onto one portion thereof.

Figure 2:
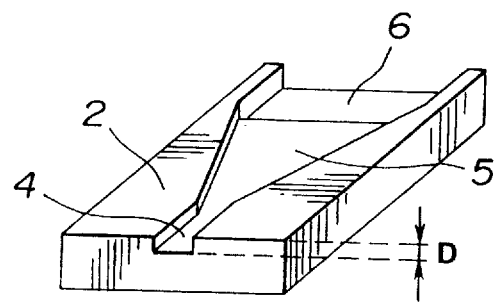
FIG. 2 is an oblique diagram showing a first substrate used to compose an optical fibre array relating to a mode for implementing the present invention.
Figure 5:
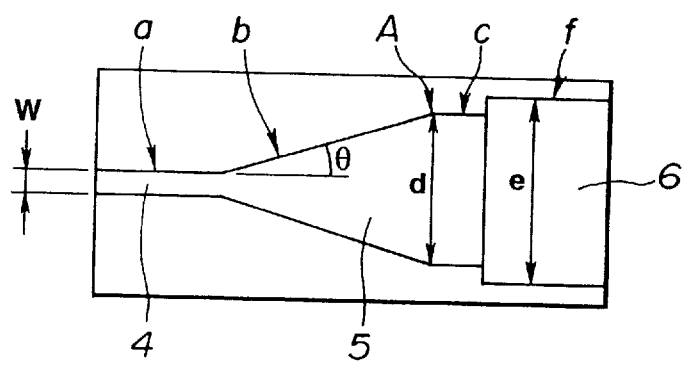
FIG. 5 is a plan view of the first substrate shown in FIG. 2.

As shown in FIG. 2 and FIG. 5, the first substrate 2 comprises a parallel groove 4 provided at one end thereof, which accommodates the end sections of the plurality of optical fibres 1, a tapered groove 5 which connects to this parallel groove 4 and gradually widens, and an approximately rectangular groove 6 provided at the other end of the substrate, which accommodates the optical fibres 1 where the covering portions 9 are formed. The parallel groove 4 has a width W slightly larger than the sum of the diameters of the optical fibres 1, and a depth D slightly smaller than the diameter of the optical fibres 1.

Figure 3:
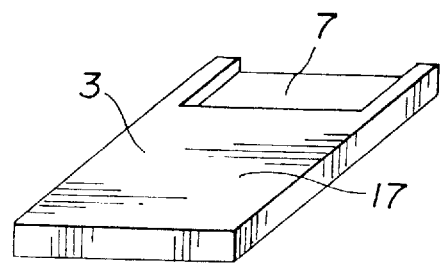

As shown in FIG. 3, the second substrate 3 comprises a flat surface 17 which contacts portions of the optical fibres 1, and an approximately rectangular groove 7 which accommodates the portions of the optical fibres 1 where the covering portions 9 are formed.

Figure 1:
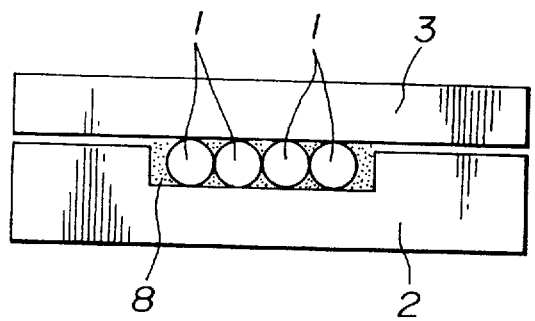
FIG. 1 is a side view of an optical fibre array relating to a mode for implementing the present invention, viewed from an end where the end portions of optical fibres are exposed.

As shown in FIG. 1, the optical fibres 1 where the plurality of covering portions 9 are not formed are aligned into a flat shape in close mutual contact inside the parallel groove 4 in the first substrate 2. An adhesive 8 is coated onto, or filled into, the space between the first substrate 2 and the second substrate 3. The two substrates and the optical fibres 1 are bonded together by means of this adhesive, producing mechanical strength to withstand pulling of the optical fibres 1, or the like.

In the present invention, the most important points to note are that the width W of the parallel groove 4 formed at one end of the first substrate 2 is larger than the sum of the diameters of the aligned optical fibres 1, the depth D of the parallel groove 4 is smaller than the diameter of the aligned optical fibres 1, and this parallel groove 4 is formed such that it connects to the tapered groove 5, which widens in the direction of the groove 6 formed at the other end of the first substrate 2.

To arrange the optical fibres 1 in a prescribed position between the substrates 2 and 3, firstly, the surface of the first substrate 2 wherein the grooves are formed and the surface of the second substrate 3 wherein the groove 7 is formed are placed in opposition such they are mutually facing, as shown in FIG. 4. Thereupon, the borders between the portions of the optical fibres 1 where no covering portions 9 are formed and the portions of the optical fibres 1 where the covering portions 9 are formed, are aligned, and the plurality of optical fibres 1 are provisionally arrayed in a flat configuration in close mutual contact. Next, the portions of the optical fibres 1 where no covering portions 9 are formed are inserted via grooves 6 and 7 in the first substrate 2 and the second substrate 3 towards the parallel groove 4. In so doing, the optical fibres 1 are made to converge gradually in the tapered groove 5, and in the vicinity of the border with the parallel groove 4, they assume close mutual contact. Thereupon, pressure is applied causing the optical fibres 1 to converge towards the end of the parallel groove 4, and they become accommodated inside the parallel groove 4 in a state of close mutual contact. Next, by pressing down the optical fibres 1 accommodated in the parallel groove 4 in a closely-contacting state, by means of the flat surface 17 of the second substrate 3, the optical fibres 1 are aligned inside the parallel groove 4 and form a flat, closely-contacting array.

In this way, since the optical fibres 1 are formed into a closely-contacting array by means of the force causing the optical fibres 1 to converge towards the parallel groove 4, it is possible for the width W of the parallel groove 4 to be made greater than the sum of the diameters of the optical fibres 1. Consequently, it is not necessary to give an exact specification for the width W dimension of the parallel groove, and therefore a merit is obtained in that advanced processing techniques are not required in the formation of the parallel groove 4.

Next, an optical fibre array relating to the present mode for implementation is described in more specific terms.

Firstly, the desirable range for the width W of the parallel groove 4 formed in the first substrate 2 will be described. With respect to the object of the present invention, it is desirable that the width W of the parallel groove 4 is sufficiently greater than the sum of the diameters of the optical fibres 1, so that a plurality of optical fibres 1 can be inserted readily into the parallel groove 4 to form a closely-contacting array. However, the greater the width W of the parallel groove 4, the weaker the force causing the optical fibres 1 to converge towards the centre, and therefore, the looser the contact between the optical fibres 1. Furthermore, in the present structure, since no absolute positions are specified for the optical fibres 1 forming a closely-contacting array inside the parallel groove 4, certain limits are placed on the width W of the parallel groove 4 in order to achieve the prescribed accuracy in the closely-contacting array.

In general, an optical fibre array is aligned in terms of its optical axis with a waveguide-type optical component having a plurality of input/output terminals, or an array-type optical component wherein a plurality of light-emitting elements and light-receiving elements are arrayed, or the like, and its is fixed thereto by a method such as adhesion, or the like. Alignment of the optical axes involves broad alignment so that light can be transmitted, and precise alignment in order to obtain optimum positioning of the optical axes. However, in cases where a certain degree of positional accuracy is guaranteed in the optical fibre array and the optical component to which it is being connected, light transmission can be achieved by setting the components in optical stages, and broad alignment becomes unnecessary. Moreover, if the positional accuracy is raised;, it is also possible to remove the need for precise alignment as well, but since extremely advanced techniques are required in the substrate processing, this will result in higher costs.

Therefore, it is desirable for the positional accuracy of the optical fibres in the optical fibre array to be within a range whereby light transmission can be achieved immediately when the components are set in optical stages. Considering, as a general example, a case where the cross-sectional dimensions of optical waveguides in the connecting section of an optical component being connected to the optical fibre array are equal to the core of the optical fibres used in the optical fibre array, positional accuracy within a range two times the size of the core diameter is required for the optical fibres, in order to remove the need for broad alignment.

From the foregoing, it is desirable for the width W of the parallel groove 4 to be within the following range.

$$nK < W < Nk + 2L$$

(where n is the number of arrayed optical fibres, K is the diameter of the optical fibre cladding, and L is the diameter of the optical fibre core.)

It goes without saying that in cases where accuracy is not required in the positioning of the optical fibres, for example, where the cross-sectional dimensions of the optical component being connected to the optical fibre array are relatively large compared to the optical fibres, the aforementioned range limits do not apply.

Next, the depth D of the parallel groove 4 is described. In the present mode for implementation, a plurality of optical fibres 1 are accommodated in the parallel groove 4 in the first substrate 2, and the optical fibres 1 are aligned and formed into a closely-contacting array by applying pressure to the optical fibres 1 by means of the flat surface 17 of the second substrate 3. In other words, the base of the parallel groove 4 in the first substrate 2 and the flat surface 17, in the second substrate 3 are required, respectively, to form close contact with the optical fibres 1. Furthermore, a gap for an adhesive layer 8, albeit a small gap, is necessary between the first substrate 2 and the second substrate 3.

Consequently, the depth D of the parallel groove 4 must be smaller than the outer diameter of the cladding of the optical fibres 1. Moreover, in order that the optical fibres 1 in the outermost positions receive a force from the side walls of the parallel groove 4 causing them to converge towards the centre when the optical fibres 1 are inserted, desirably, the depth of the parallel groove 4 should be greater than ½ of the cladding diameter of the optical fibres. In other words, a desirable range for the depth D is given by the following formula.

$$(\tfrac{1}{2})K < D < K$$

(where K is the diameter of the optical fibre cladding.)

There are not particular limitations on the length, a, of the parallel groove 4, but in cases where there is a large gap in the lateral direction when the optical fibres are formed into a closely-contacting array in the parallel groove 4, if the parallel groove 4 is extremely short, then large discrepancies will occur in the parallelism of the optical fibres with respect to the walls of the parallel groove 4, causing devications in the perpendicularity of the optical fibres with respect to the end surface, and thereby leading to increased optical losses. Furthermore, it is undesirable if the parallel groove 4 is made longer than necessary, from the viewpoint of having to increase the size of the optical fibre array itself. For these reasons, in broad terms, a desirable range for the length, a, of the parallel groove 4 is of the order of 2–20 times the width W of the parallel groove 4.

Next, a description is given of the tapered groove 5 which connects to the parallel groove 4 and widens in the same plane (having a common groove depth D). The object of providing the tapered groove is so that a plurality of optical fibres arrayed provisionally in a flat shape, such as the shape of a tape, or the like, can be guided simply into the parallel groove 4. The optical fibres converge towards the centre as they move along the tapered groove 5, and they bend sharply in the vicinity of the border between the parallel groove 4 and the tapered groove 5. If this bend angle is very large, it becomes difficult to introduce the optical fibres smoothly from the tapered groove 5 into the parallel groove 4, and therefore it is desirable to set the bend angle θ, shown in FIG. 5, to 45° or less. Providing the bend section with a radius to make the corners smoother is also advantageous in preventing damage to the optical fibres. The boundary line, b, of the tapered groove 5 may be a straight line, or it may be curved.

The groove width, d, of the tapered groove 5 at its point of maximum widening, A, should allow the uncovered portions of the provisionally arrayed optical fibres to be inserted readily, and although there are not particular limitations, in broad terms, the following range is desirable.

$$nH-2T < d \leq nH-2T+1 \text{ mm}$$

(where H is the diameter of the optical fibre covering, T is the thickness of the optical fibre covering, and n is the number of arrayed optical fibres.)

Furthermore, the tapered groove 5 may be extended in parallel form to a desired length from its widest point, A, towards the square groove, (corresponding to c in FIG. 5), but from the viewpoint of making the component more compact, it is desirable for the length of c to be short, and it may even be zero.

The dimensions of the approximately rectangular groove 6 for accommodating the covered portions of the optical fibres should provide a space capable of accommodating the covered portions of the arrayed optical fibres, and whilst no precise specifications are given, in broad terms, the following ranges are desirable for the width, e, of the groove 6, and the step, h, between the groove 6 and the tapered groove 5.

$$nH < e \leq nH+0.5 \text{ mm}$$

(where H is the diameter of the optical fibre covering, and n is the number of arrayed optical fibres.)

$$T < h \leq T+0.2 \text{ mm}$$

(where T is the thickness of the optical fibre covering.)

Furthermore, the length, f, of the groove 6 should be sufficient to allow the covered portions of the optical fibres to be fixed with satisfactory strength between the two substrates using an adhesive, and whilst it is not limited in particular, a length of approximately 2–20 mm is desirable, in broad terms.

Next, the shape and dimensions of the second substrate 3 in the present invention are described.

The surface of the second substrate 3 in contact with the uncovered optical fibres may be a flat surface, but a rectangular groove 7 is required in the portion thereof where the covered optical fibres are accommodated. It is desirable for the width and length of the groove 7 in the second substrate 3 to be made equal to the width, 3, and length, f, in the first substrate 2. A desirable range for the step between the groove 7 and the flat surface is the same as that for h in the first substrate described above.

As mentioned in the description of the tapered groove 5, in the first substrate 2 and the second substrate 3, it is advantageous for preventing damage to the optical fibres if the band angle or step regions in contact with the uncovered optical fibres are formed with smooth corners.

Moreover, in addition to the structure described thus far, it is possible to improve operability further, by, for example, providing a guide groove in one of the substrates and forming the other substrate such that it fits thereon, in order to simplify positional registration when superposing the first substrate and the second substrate.

With regard to a method of manufacturing an optical array according to the present invention, the first substrate 2 comprising a parallel groove 4, tapered groove 4 and a groove 6, and the second substrate 3 comprising a flat surface and a groove 7, are placed together such that the surfaces containing the respective grooves are mutually facing, these adjoining faces having previously been coated, or filled, with adhesive, and in a state whereby the covered portions of a plurality of optical fibres 1 which have had the covering removed from the end thereof, are arranged provisionally in a flat shape, such as the shape of a tape, or the like, forming close mutual contact, the optical fibres 1 are inserted into grooves 6, 7, the ends of the plurality of optical fibres 1 pass along the tapered groove 5 formed in the first substrate and reach the end of the parallel groove 4, and the covered portions of the optical fibres are accommodated in grooves 6, 7, whereupon the second substrate is pressed down towards the first substrate such that the optical fibres 1 form close contact with the respective substrates, and the adhesive 8 hardens to fix the substrates and optical fibres 1 together, thereby forming an optical fibre array.

According to the composition described above, it is possible to manufacture substrates for use in the optical fibre array of the present invention at low cost by means of methods such as mechanical processing or moulding, or the like, without the need for high-precision processing. Furthermore, it is possible to form the optical fibres into a closely-contacting array by means of the simple operation of inserting the optical fibres.

Next, a specific production example is described.

Figure 6:
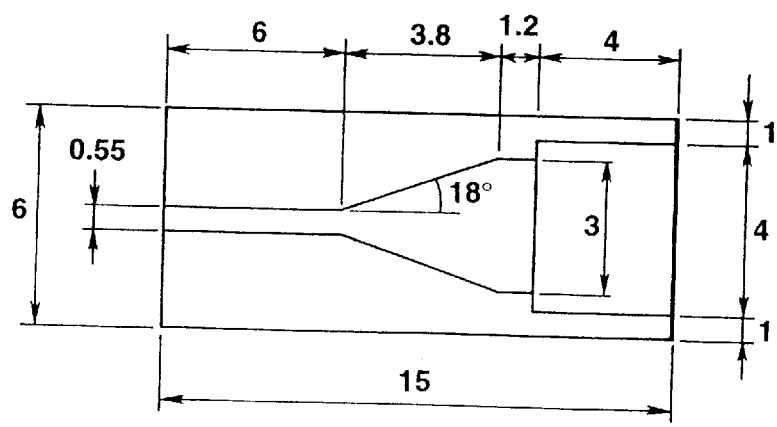
FIG. 6 is a plan view showing a production example of the first substrate shown in FIG. 2.
Figure 7:
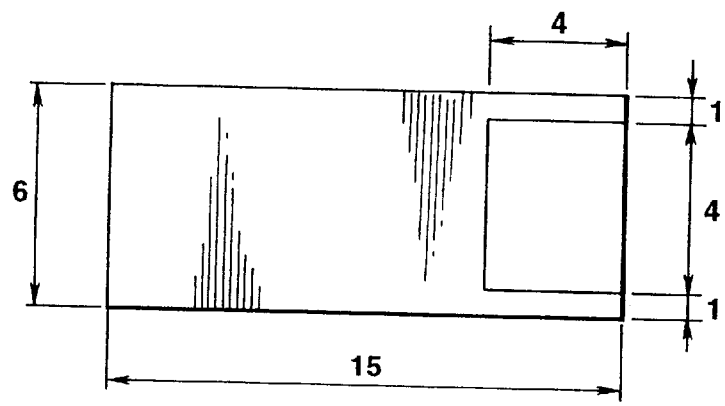
FIG. 7 is a plan view showing a production example of the second substrate shown in FIG. 3.
Figure 8:
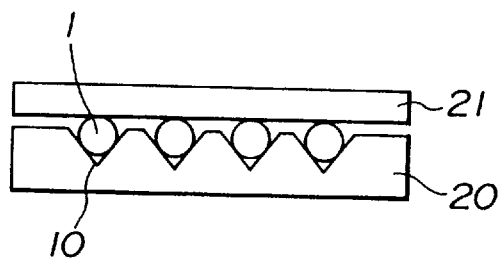
FIG. 8 is a side view showing a conventional optical fibre array.
Figure 9:
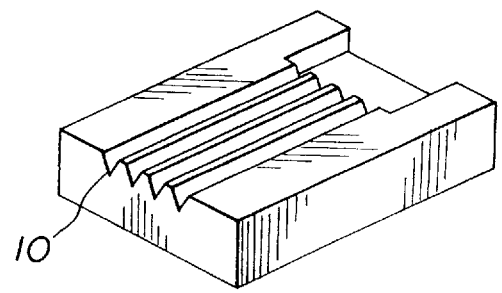
FIG. 9 is an oblique view of a substrate used to compose the optical fibre array shown in FIG. 8.
Figure 10:
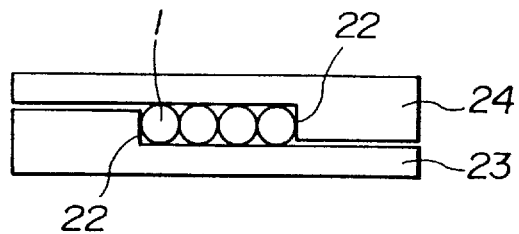
FIG. 10 is a side view of a conventional optical fibre array.
Figure 11A:
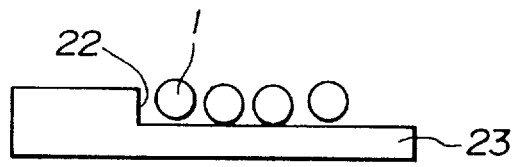
FIGS. 11a and 11b are side views showing one part of a manufacturing process for the optical fibre array shown in FIG. 10.
Figure 11B:
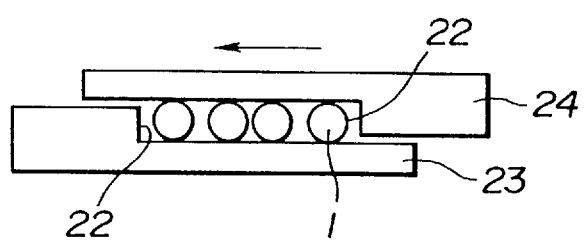
Figure 12:
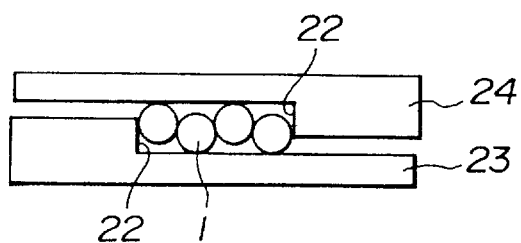
FIG. 12 is a side view showing an unsatisfactory example of the optical fibre array shown in FIG. 10.

FIG. 6 and FIG. 7 are plan views showing the dimensions of production examples of the first substrate 2 and the second substrate 3, respectively. In this production example, the optical fibres used were four optical fibre core wires having a cladding diameter of 125 mm, a core diameter of 62.5 mm, and an external covering diameter of 0.9 mm, the first substrate 2 was made from Kovar, and the second substrate 3 was made from glass. The external dimensions of the first substrate 2 were: width 6 mm, length 15 mm, and height 2 mm; and those of the second substrate 3 were: width 6 mm, length 15 mm, and height 1.2 mm.

The parallel groove 4 in the first substrate 2 had: width 500 mm, length 6 mm, and depth 120 mm; the tapered groove 5 had: bend angle 18°, and maximum width 3 mm; and the groove 6 had: width 4 mm, length 4 mm, and a step of 0.5 mm with respect to the tapered groove.

Furthermore, the groove 7 in the second substrate 3 had: width 4 mm, length 4 mm, and a step of 0.5 mm with respect to the flat surface.

The process for arraying the optical fibres of the above construction follows the steps described below.

FIG. 4 is an oblique diagram illustrating a method of arraying optical fibres in the optical fibre array in FIG. 1.

Thermosetting adhesive is coated onto every part of the face of the first substrate 2 containing grooves 4, 5, 6, and the second substrate 3 is superposed thereon, with the surface containing the groove 7 facing downwards, and it is pressed lightly. Next, four optical fibres, which have had their coatings removed at the ends thereof, are arrayed provisionally in the shape of a tape and are inserted via grooves 6, 7, such that the ends of the optical fibres reach the end of the parallel groove 4 and the covered portions are accommodated in grooves 6, 7, whereupon the second substrate 3 is pressed down, such that the upper and lower sides of the optical fibres 1 form close contact with the two substrates 2, 3, and it is fixed in this state whilst heat is applied, causing the adhesive to harden and forming the optical fibres 1 and the substrates 2, 3 into an integrated unit.

When the end section of an optical fibre array obtained in this way was polished and inspected, the four optical fibres were arrayed in a linear configuration in close mutual contact, as shown in FIG. 1.

As described above, according to this this production example, it is possible to obtain an optical fibre array wherein optical fibres are formed into a closely-contacting array with good positional accuracy, by means of the extremely simple operation of inserting a plurality of optical fibres between two substrates.

As described above, according to the present invention, it is possible to obtain an optical fibre array wherein optical fibres are formed into a closely-contacting array to a high degree of accuracy, by inserting a plurality of optical fibres between a pair of substrates, consisting of a first substrate comprising a parallel groove, a tapered groove connected thereto, and a rectangular groove, and a second substrate comprising a flat surface and a square groove. Furthermore, since no high-precision processing is required for the substrates used to manufacture the array, and moreover, since the operation for arraying the optical fibres is simple, it is possible to provide the optical fibre array at low cost and high yield rate.

What is claimed is:

1. An optical fibre array comprising:

a pair of substrates consisting of a first substrate and a second substrate; and a plurality of optical fibres, the end portions of which are fixed to said pair of substrates; wherein the ends of portions of said plurality of optical fibres where no covering portions are formed are formed into a closely-contacting array in a line at one end of said substrate;

the portions of said optical fibres where covering portions are formed are held at the other end of said substrates;

said first substrate comprises, in the side at said one end thereof, a parallel groove for accommodating the ends of the portions of said plurality of optical fibres where no covering portions are formed, in the side at said other end thereof, an approximately rectangular groove for accommodating the portions of said optical fibres where covering portions are formed, and a tapered groove which connects from said parallel groove towards the approximately rectangular groove whilst widening; and said second substrate comprises, in the side at said other end thereof, a rectangular groove for accommodating the portions of said optical fibres where covering portions are formed.

2. An optical fibre array according to claim 1, wherein the width of said parallel groove is greater than the sum of the diameters of the arrayed plurality of optical fibres, and the depth of said parallel groove is smaller than the diameter of said optical fibres.

3. An optical fibre array according to claim 2, wherein the width W and depth D of said parallel groove may be expressed by the following formulae (1) and (2), when the diameter of the cladding of said optical fibres is taken as K, the core diameter of the optical fibres is taken as L, and the number of arrayed optical fibres is taken as n:

$$nK < W < nK + 2L \quad (1)$$

$$(\tfrac{1}{2})K < D < K \quad (2).$$

4. A method of manufacturing an optical fibre array comprising:

a step whereby a first substrate, wherein a parallel groove is formed at one end thereof for accommodating the ends of portions of a plurality of optical fibres where no covering portions are formed, an approximately rectangular groove is formed at the other end thereof for accommodating the portions of said optical fibres where covering portions are formed, and a tapered groove is formed which connects from said parallel groove towards the approximately rectangular groove whilst widening, is coated, or filled, with adhesive, on the side thereof wherein said grooves are formed;

a step whereby a second substrate, wherein an approximately rectangular groove is formed at said other end thereof for accommodating the portions of said optical fibres where covering portions are formed;

a step whereby said first substrate and second substrate are placed in mutual opposition such that their respective grooves are facing each other;

a step whereby the borders between the portions of said plurality of optical fibres where no covering portions are formed and the portions thereof where covering portions are formed, are aligned, and said covering portions are arrayed provisionally in a flat configuration in close mutual contact;

a step whereby the ends of the portions of said provisionally arrayed optical fibres where no covering portions are formed, are inserted from the side of said substrates placed in mutual opposition which contains the rectangular grooves, and into said parallel groove;

a step whereby, after said insertion, said second substrate is pressed down on the first substrate such that said inserted optical fibres form close contact with the substrates;

a step whereby said adhesive is caused to harden whilst maintaining said state of pressing, and said first substrate and second substrate, and the plurality of optical fibres, are fixed together to form an integrated unit; and a step whereby, after said fixing, the exposed ends of the portions of the optical fibres where no covering portions are formed, are polished.

5. A method of manufacturing an optical fibre array comprising:

a step whereby a first substrate, wherein a parallel groove is formed at one end thereof for accommodating the ends of portions of a plurality of optical fibres where no covering portions are formed, an approximately rectangular groove is formed at the other end thereof for accommodating the portions of said optical fibres where covering portions are formed, and a tapered groove is formed which connects from said parallel groove towards the approximately rectangular groove whilst widening;

a step whereby a second substrate, wherein an approximately rectangular groove is formed at said other end thereof for accommodating the portions of said optical fibres where covering portions are formed, is coated, or filled, with adhesive, on the side thereof wherein said groove is formed;

a step whereby said first substrate and second substrate are placed in mutual opposition such that their respective grooves are facing each other;

a step whereby the borders between the portions of said plurality of optical fibres where no covering portions are formed and the portions thereof where covering portions are formed, are aligned, and said covering portions are arrayed provisionally in a flat configuration in close mutual contact;

a step whereby the ends of the portions of said provisionally arrayed optical fibres where no covering portions are formed, are inserted from the side of said rectangular grooves, and into said parallel groove;

a step whereby, after said insertion, said second substrate is pressed down on the first substrate such that said inserted optical fibres form close contact with the substrates;

a step whereby said adhesive is caused to harden whilst maintaining said state of pressing, and said first substrate and second substrate, and the plurality of optical fibres, are fixed together to form an integrated unit; and a step whereby, after said fixing, the exposed ends of the portions of the optical fibres where no covering portions are formed, are polished.

6. A method of manufacturing an optical fibre array comprising:

a step whereby a first substrate, wherein a parallel groove is formed at one end thereof for accommodating the ends of portions of a plurality of optical fibres where no covering portions are formed, an approximately rectangular groove is formed at the other end thereof for accommodating the portions of said optical fibres where covering portions are formed, and a tapered groove is formed which connects from said parallel groove towards the approximately rectangular groove whilst widening, is coated, or filled, with adhesive, on the side thereof wherein said grooves are formed;

a step whereby a second substrate, wherein an approximately rectangular groove is formed at said other end thereof for accommodating the portions of said optical fibres where covering portions are formed, is coated, or filled, with adhesive, on the side thereof wherein said groove is formed;

a step whereby said first substrate and second substrate are placed in mutual opposition such that their respective grooves are facing each other;

a step whereby the borders between the portions of said plurality of optical fibres where no covering portions are formed and the portions thereof where covering portions are formed, are aligned, and said covering portions are arrayed provisionally in a flat configuration in close mutual contact;

a step whereby the ends of the portions of said provisionally arrayed optical fibres where no covering portions are formed, are inserted from the side of said substrates placed in mutual opposition which contains the rectangular grooves, and into said parallel groove;

a step whereby, after said insertion, said second substrate is pressed down on the first substrate such that said inserted optical fibres form close contact with the substrates;

a step whereby said adhesive is caused to harden whilst maintaining said state of pressing, and said first substrate and second substrate, and the plurality of optical fibres, are fixed together to form an integrated unit; and a step whereby, after said fixing, the exposed ends of the portions of the optical fibres where no covering portions are formed, are polished.

\* \* \* \* \*

UNITED STATES PATENT AND TRADEMARK OFFICE
CERTIFICATE OF CORRECTION

PATENT NO. : 5,812,726

DATED : September 22, 1998

INVENTOR(S) : Jinnai et al.

It is certified that error appears in the above-identified patent and that said Letters Patent is hereby corrected as shown below:

In column 3, ln. 47 insert "FIG. 3 is an oblique diagram showing a second substrate used to compose an optical fibre array relating to a mode for implementing the present invention;".

In claim 5, ln. 62-63, after "are inserted from the side of said", insert "substrates placed in mutual opposition which contains the".

Signed and Sealed this

Seventh Day of September, 1999

Attest:

Q. TODD DICKINSON

Attesting Officer

Acting Commissioner of Patents and Trademarks